US009172701B2

(12) United States Patent
Burch et al.

(10) Patent No.: US 9,172,701 B2
(45) Date of Patent: Oct. 27, 2015

(54) TECHNIQUES FOR SECURE DEBUGGING AND MONITORING

(71) Applicant: NetIQ Corporation, Provo, UT (US)

(72) Inventors: Lloyd Leon Burch, Payson, UT (US); Carolyn B. McClain, Springville, UT (US); Robert Skousen Stilmar, Payson, UT (US); Dipto Chakravarty, Potomac, MD (US); Baha Masoud, Orem, UT (US); Michael F. Angelo, Spring, TX (US)

(73) Assignee: NetIQ Corporation, Provo, UT (US)

( * ) Notice: Subject to any disclaimer, the term of this patent is extended or adjusted under 35 U.S.C. 154(b) by 0 days.

(21) Appl. No.: 13/728,224

(22) Filed: Dec. 27, 2012

(65) Prior Publication Data
US 2014/0189775 A1    Jul. 3, 2014

(51) Int. Cl.
*H04L 29/06*    (2006.01)
*G06F 21/00*    (2013.01)

(52) U.S. Cl.
CPC ............... *H04L 63/10* (2013.01); *G06F 21/00* (2013.01)

(58) Field of Classification Search
CPC .............................. H04L 63/10; G06F 21/00
See application file for complete search history.

(56) References Cited

U.S. PATENT DOCUMENTS

| 6,742,177 | B1 | 5/2004 | Dorak, Jr. et al. |
| 7,774,758 | B2 | 8/2010 | Nardini et al. |
| 8,266,684 | B2 * | 9/2012 | Kline et al. ........................ 726/9 |
| 2005/0050159 | A1 * | 3/2005 | Suraski ........................... 709/217 |
| 2006/0259828 | A1 | 11/2006 | Swoboda |
| 2009/0165111 | A1 | 6/2009 | Zhang et al. |
| 2010/0299467 | A1 | 11/2010 | Yoon |
| 2013/0054968 | A1 * | 2/2013 | Gupta ............................. 713/168 |

\* cited by examiner

*Primary Examiner* — Izunna Okeke
(74) *Attorney, Agent, or Firm* — Schwegman Lundberg & Woessner, P.A.

(57) ABSTRACT

Techniques for secure debugging and monitoring are presented. An end user requests a secure token for logging information with a remote service. A secure monitoring and debugging token service provides the secure token. The remote service validates the secure token and configures itself for capturing information and reporting the captured information based on the secure token.

14 Claims, 6 Drawing Sheets

TECHNIQUES FOR SECURE DEBUGGING AND MONITORING

BACKGROUND

Enterprises may rely on end-users or developers to assist in tracking and resolving issues with services provided by the enterprises. However, this may create a problem when detailed information is displayed to the end user. In fact, it is common for hackers to use debug information to break the security of a system. Thus, by providing this type of control to the end-users, the enterprises may expose their systems to security risks.

From a business perspective, there may be periods of time where an increased level of tracking is required as result of: a business concern, troubleshooting a system issue, behavior pattern deviances, and/or other potential security risks. There are several problems created when web services need to provide more debug and monitoring information. If an administrator turns on advanced debugging or monitoring for the system, then too much data may be generated, which can cause the enterprise service to appear unresponsive or broken. Additionally, the amount of information generated may result in storage problems; or create a security vulnerability by exposing sensitive information.

So, an administrator may want to vary end-user monitoring based on the security risk of individuals or the administrator may want to allow end users to influence how much debugging or monitoring is done on their accounts. This is typically achieved by placing a cookie on the browser that turns on "debug" or "monitoring" to a specific level. The cookie can be set automatically, or set by the end user that selects an option to enable debugging. The problem is that there is often no security on the cookie set. Basically, any user can set any cookie on any browser once he/she has seen the cookie, which means a hacker can set the same cookie thereby enabling debug, which may disclose information about the system that can be used to break in that system (creating a security hole). It is also well known that the set of values of a cookie used for enabling debugging capabilities is commonly posted on hacker web sites.

Another common problem with uncontrolled or unsecure debugging and monitoring is that the browser view, which is viewed by an end user comes from many web services; some of which may not be owned or operated by the end user's company. A simple cookie that is used to enable advanced debug information does not have enough data or security for an external web service to trust the request and send advanced debug or monitoring data.

SUMMARY

Various embodiments of the invention provide techniques for secure debugging and monitoring. In an embodiment, a method for secure debugging is presented.

Specifically, selections for logging information with a remote service are received. Next, a policy is evaluated to determine whether the selections are permissible. Finally, a secure token is generated that identifies a principal, the remote service, and the selections permitted by the policy.

DETAILED DESCRIPTION

Figure 1A:
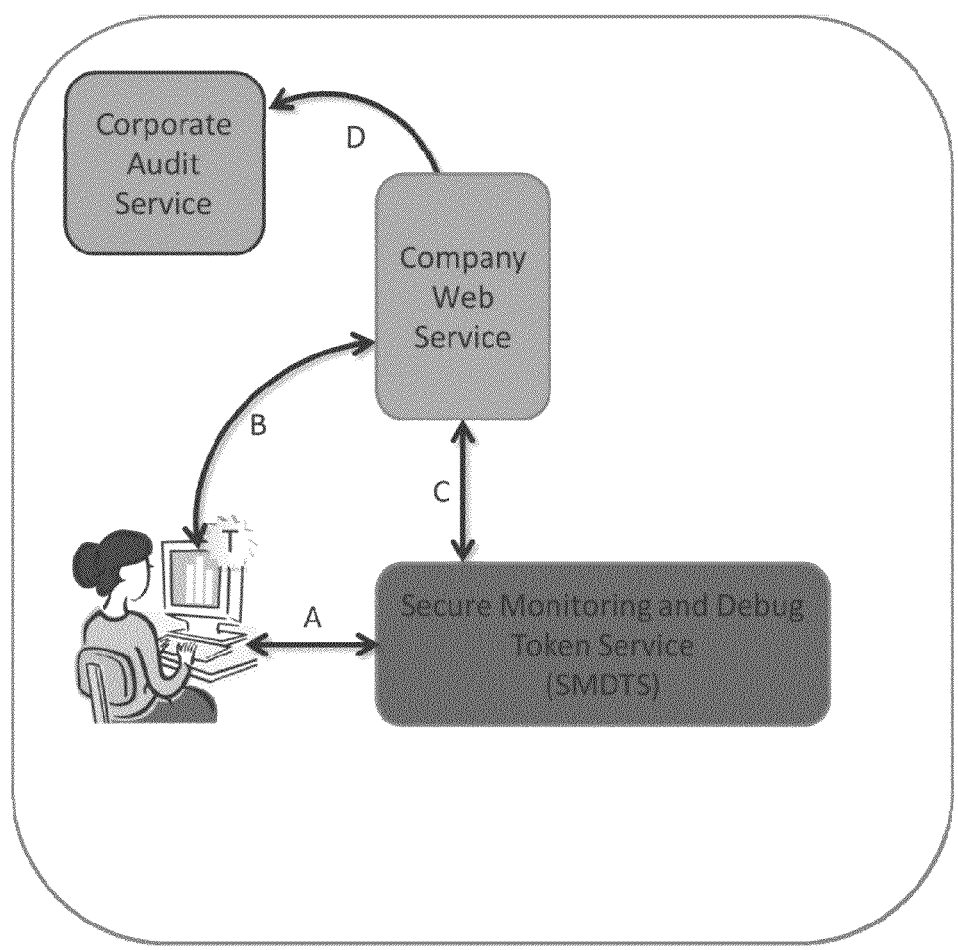
FIGS. 1A-1C are diagrams depicting example techniques for secure debugging, according to example embodiments presented herein.

A "resource" includes a user, service, system, device, directory, data store, groups of users, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures.

Also, the techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

Figure 1B:
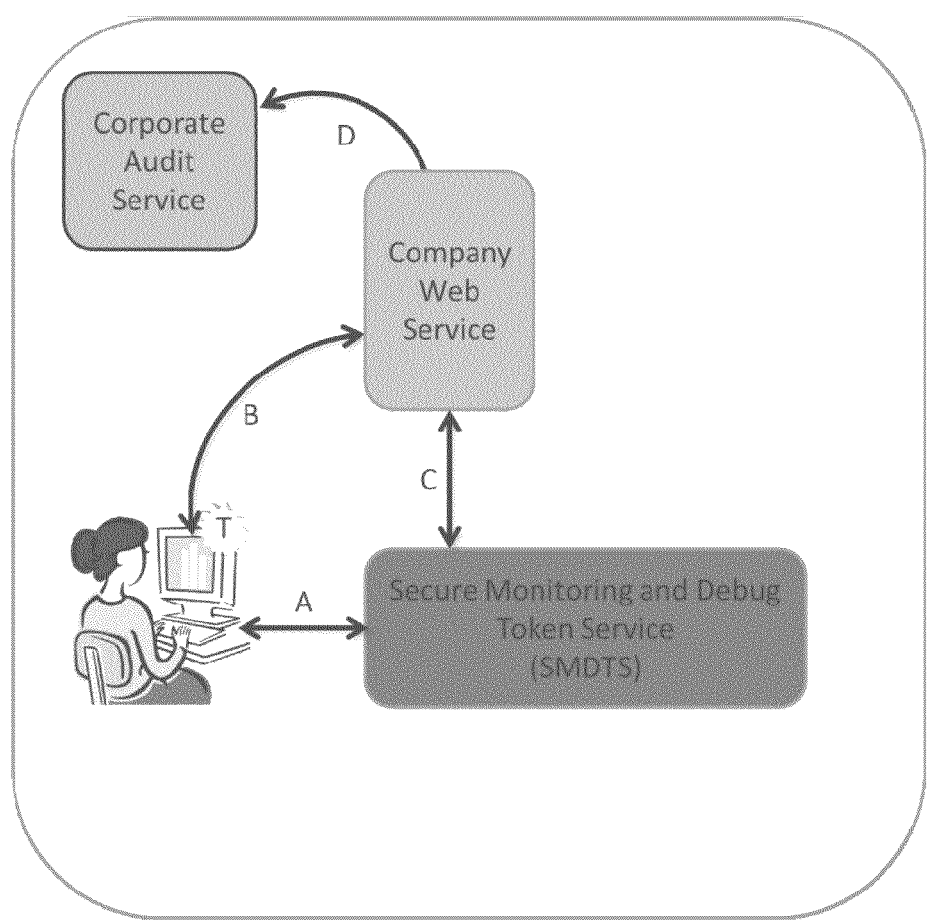
Figure 1C:
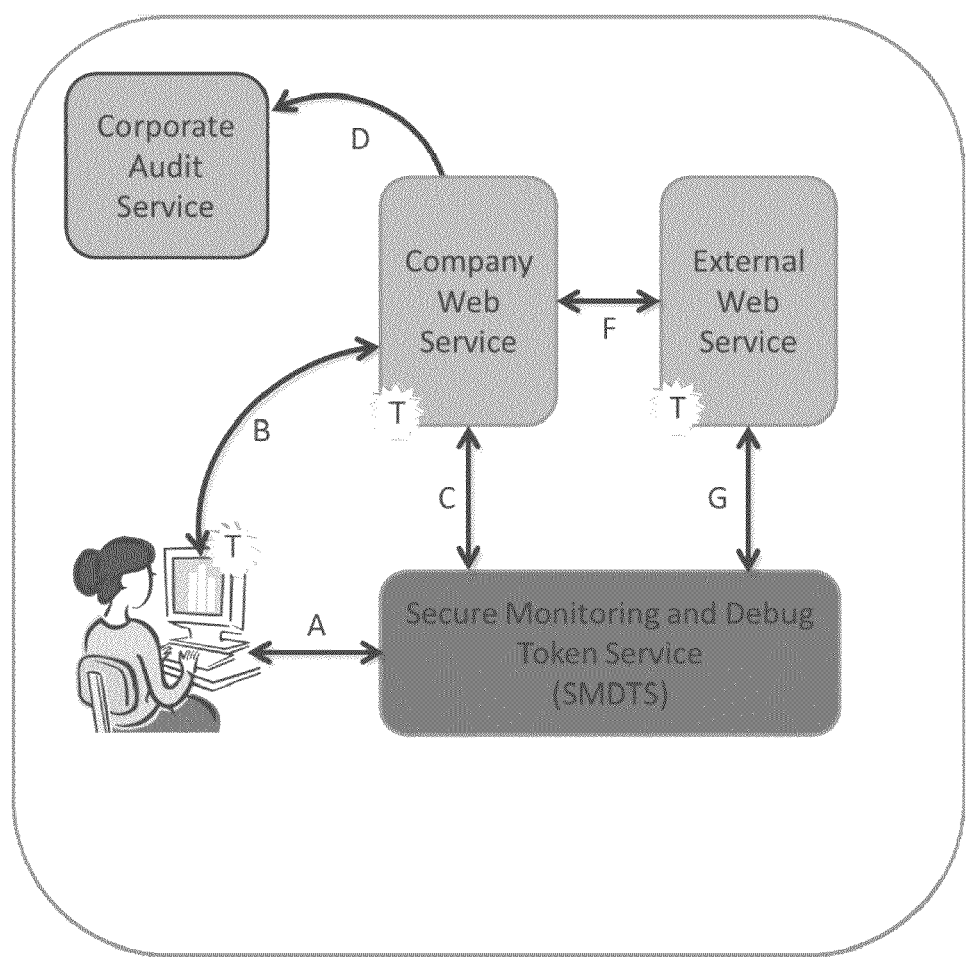

FIGS. 1A-1C are diagrams depicting example techniques for secure debugging, according to example embodiments presented herein. The technique include a variety of components that is implemented, programmed, and resides within memory and/or a non-transitory machine-readable storage medium that executes on one or more processors of a network. The network may be wired, wireless, or a combination of wired and wireless.

It is noted that the components and interactions of the FIGS. 1A-1C are presented for purposes of illustration and that other arrangements including more or less components are possible without departing from the teachings provided herein.

A tenet of the embodiments presented herein with respect to providing debugging and monitoring security is to provide just enough debug or monitoring data, to those that have a need and also have the rights to see and use the data. Information generation can be done automatically by policy; selected by the end user that is controlled by policy; and/or controlled by the administrator.

The techniques herein solve the problem described above by using a "Secure Monitoring and Debug Token Service" (SMDTS and as shown in the FIGS. 1A-1B). Tokens made by the SMDTS (or other entities as discussed below) are open standard federation tokens (in some embodiments) having information that controls what level of debugging and monitoring information is produced, and where to send the information. These tokens can be signed by: the SMDTS, and/or a trusted authority and, the tokens may define identity, roles and other needed data. The tokens may be stored as the value of a cookie on the browser, included in headers, and/or other means. The token may also be limited to the scope of a single browser session, a single user, and/or a web service and, the token may have a limited time to live. Because the tokens are signed, optionally encrypted and have controlled limited use, reuse and spoofing is controlled. It is noted that the SMDTS does not do any logging or monitoring; the service just provides an enabling token to web services that actually do the logging or data production.

The FIGS. 1A-1C depict some data flows showing how various embodiments of the invention are to work. This is presented for purposes of illustration and comprehension and is not intended to specifically limit other embodiments derived from the teachings presented herein and below.

The FIG. 1A shows how processing begins with an end user that is connected to a company web service and the SMDTS. The end user (working on a client device) using a browser (or other enterprise network client service, such as an app) obtains a token from the SMDTS. This can be achieved in a variety of ways.

For example, the user can go directly to the SMDTS, via A, and selects particular options for receiving a token for debugging and/or monitoring with respect to the Company Web Service.

It is noted that although the FIGS. 1A-1C are discussed from the perspective of a web browser and a web service, this does not have to always be the case, as the end user can have a mobile client device, such as a phone or tablet, which uses an app to interact with a remote service provided to that app (the remote service being the Company Web Service).

In another case, the user, using the client service, interacts directly with the Company Web Service and then is redirected, via B through A, to the SMDTS with a request for a token.

In still another embodiment, the user, using the client service, interacts directly with the Company Web Service and the Company Web Service sends a request for the token (via C) on behalf of the user to the SMDTS. The token returned by the SMDTS is then sent back to the user, via the client service, using B.

At this point, the user, via the client service, is in possession of or is associated with a secure token.

The FIG. 1B shows how the token is validated and used to configure the Company Web Service for debugging and/or monitoring.

Specifically, the token is sent by the client service of the user (such as via a browser or mobile app) to the Company Web Service via B. The token is then used to determine what debugging/logging (monitoring data) to send, via D, to a remote Corporate Audit Service (or third party service) and/or to the client service via B on the client device of the end user. The information (debugging or monitoring) can then be written to an audit system and/or may be output to the end user's console via headers or display. A few examples of this can be achieved is as follows:

The Company Web Service (CWS) inspects and evaluates the token, validates the token, and enables an appropriate level of debugging/logging. In an embodiment, the token type is a Security Assertion Markup Language (SAML) token.

In another case, the Company Web Service sends the token to the SMDTS, via C. The SMDTS validates the token and returns to the CWS the debugging/logging levels. Secure Socket Layer (SSL) communication may be used to ensure security and validate the identity of the SMDTS. Again, example token types can include SAML and OAuth (Open standard for Authorization).

The FIG. 1C shows an alternative arrangement (to the FIG. 1C) that uses one more additional external services for identifying the debugging/logging levels for the end user.

The FIG. 1C shows an embodiment where the Company Web Service uses the token to interact with another External Web Service, via F. The External Web Service can use the token to determine the debugging/logging level to use for the end user in the following manners.

The External Web Service understands the token and validates the token. Once this is done, the External Web Service enables the debugging/logging levels for the end user. Again, the token type can be a SAML token.

In another situation, the External Web Service sends the token, via G, to the SMDTS. The SMDTS validates the token and returns the debugging/logging levels. SSL may be used for secure communications and to validate an identity for the SMDTS. Again, the token types can include SAML and OAuth.

The FIGS. 1A-1C shows how logging (monitoring) and debugging can be secured by preventing unauthorized access. This can be achieved via open standard federation tokens. Moreover, the techniques allow for logging/debugging information to be passed to third party web service(s) while maintaining a secure and trusted relationship. It does not require the calling application to setup this trust but uses another trust relationship that both parties agree on.

Still further, the techniques herein provide identity and policy to determine the logging/debug levels allowed by a user. This allows policy to control how and by whom debugging/logging information is controlled.

The techniques also allow for disparate party applications (cooperating web services in a variety of deployment locations) to have a single debugging and logging policy.

Further, the techniques allow a third party to control debugging and logging information.

As will be demonstrated more completely herein, the techniques allow for the selective control of debugging/logging information content. (For example, information may be selected or excluded by a specific type of request, a request from a specific device or service as indicated by the device address or service identifying information, a time based constraint or other constraining criteria uniquely identifying the information, device or service involved.)

Still further, the techniques herein reduce the volume of information amassed in logging/auditing storage. The techniques also allow for dynamic change of logging/debugging policies within a communication session.

Figure 2:
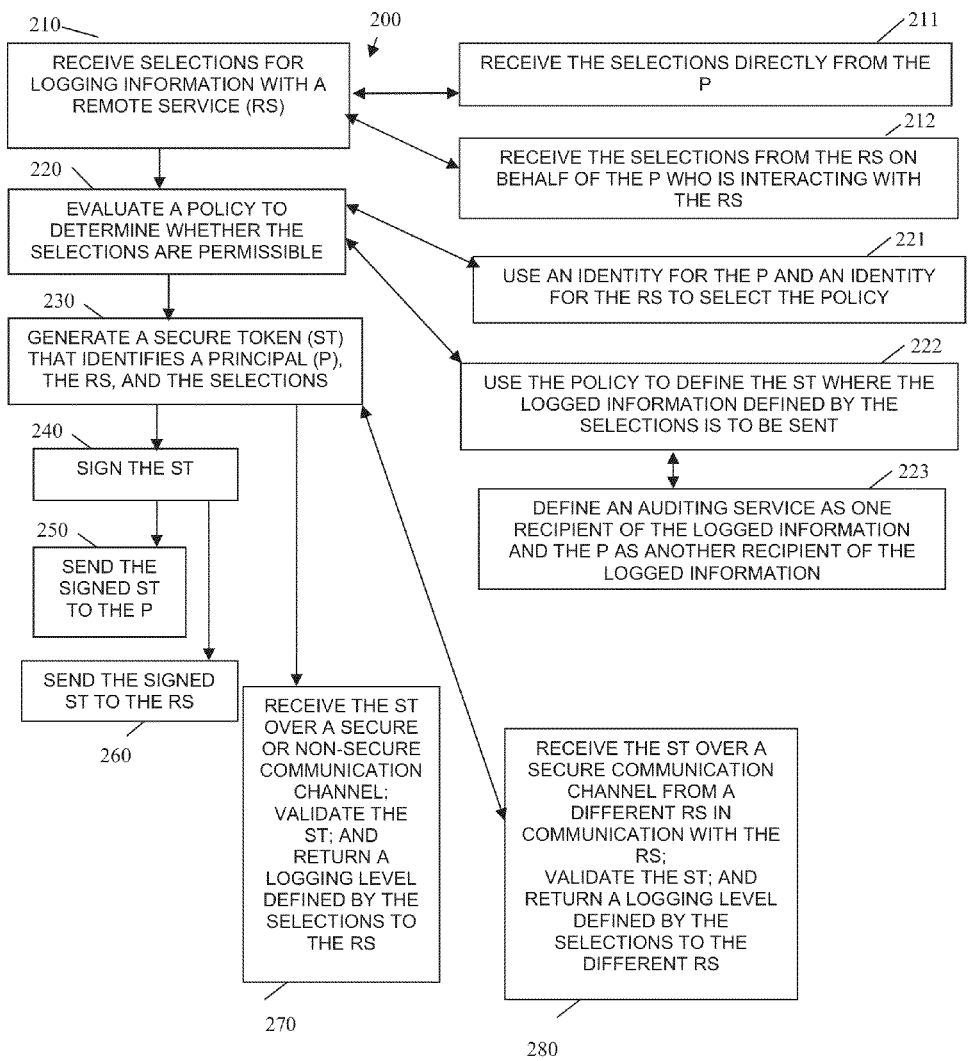
FIG. 2 is a diagram of a method for secure logging, according to an example embodiment presented herein.

FIG. 2 is a diagram of a method 200 for secure logging, according to an example embodiment presented herein. The method 200 (herein after referred to as "SMDTS") is implemented, programmed, and resides within memory and/or a non-transitory machine-readable storage medium that executes on one or more processors of a device and is operational over a network. The network may be wired, wireless, or a combination of wired and wireless.

At 210, the SMDTS receives selections for logging information with a remote service.

It is noted that as used herein the phrases "remote service," "remote network logging service," and "logging service" may be used interchangeably and synonymously. These entities provide any type of remote service to the user, such as a web service or a mobile device app service. In addition, a portion of the entities provides debugging or monitoring via logging information. How logging is initiated, what is captured during the logging, and where the resulting captured logging information is sent for evaluation are discussed herein.

According to an embodiment, at 211, the SMDTS receives the selections directly from a principal. Again, it is noted that a principal can be an end user or an automated service. In this embodiment, the SMDTS provides an interface for the principal (can be Application Programming Interface (API) when the principal is an automated service) to make the selections. The selections identify what types of logging information is captured, the frequency of capturing the logging information, instructions as to where to send the captured logging information, and the like.

Alternatively, at 212, the SMDTS receives the selections from the remote service on behalf of the principal who is interacting or who will be interacting at some point with the remote service. Here, the remote service provides an interface or API for the principal to make the selections. However, in some cases, an administrator makes the selections for the principal and it may actually be that the principal is completely unaware of the selections and the soon-to-be secure logging. This latter situation may be useful for auditing a principal for compliance or if the principal is suspected of unscrupulous activity on the remote service. In still another case, under 212, it may be that policy on the remote service defines or makes the selections on behalf of the principal and the remote service then provides the selections to the SMDTS.

At 220, the SMDTS evaluates a policy to determine whether the selections are permissible. What conditions are defined in the policy and how the policy is initially selected or obtained can be configured situations.

For example, at 221, the SMDTS uses an identity for the principal and an identity for the remote service to select the policy from a library of available policies. It may be that attributes and/or settings are used by the SMDTS to modify a template to create the policy dynamically based on the identities as well. So, the policy can be predefined or dynamically configured based on identity-based limitations.

In an embodiment, at 222, the SMDTS uses the policy to define in or with the secure token where the logged information that is defined by the selections is to be sent. That is, the secure token can be used to define where captured logged information is sent based on the policy conditions.

Continuing with the embodiment of 222 and at 223, the SMDTS defines an auditing service as one recipient of the logged information and the principal as another recipient of the logged information. It is noted that in some cases, the principal may receive the logged information via a principal or client-based service executing on a mobile client device of the principal. This can be an app on a mobile device of the principal.

At 230, the SMDTS generates a secure token that identifies the principal, the remote service, and the selections. The secure token can be encrypted or can be mapped by just the SMDTS to specific logging levels for the selections (as permitted by policy).

According to an embodiment, at 240, the SMDTS digitally signs the secure token.

Continuing with the embodiment of 240 and at 250, the SMDTS sends the signed secure token to the principal. At this point, the principal has a secure encrypted and signed token that needs to be possessed by the principal to be useful; so the likelihood of nefarious activity by an eavesdropper is substantially reduced; thereby providing increases security for debugging and monitoring.

Still continuing with the embodiment of 240 and at 260, the SMDTS sends the signed secure token directly to the remote service on behalf of the principal. This is a situation where the remote service requests the secure token on behalf of the principal and was discussed above with the discussion of the FIGS. 1A-1C.

In an embodiment, at 270, the SMDTS receives the secure token over a secure communication channel, such as SSL. In some cases, the secure token can also be delivered over a non-secure channel. Next, the SMDTS validates the token (authentication can also occur with respect to the sender and purported principal of the secure token). Finally, the SMDTS returns a logging level defined by the selections to the remote service. So, the mapping of the logging level to the secure token can be entirely controlled by the SMDTS and provided on demand to the remote service that then configures itself for capturing the logging information during interactions with the principal.

Figure 3:
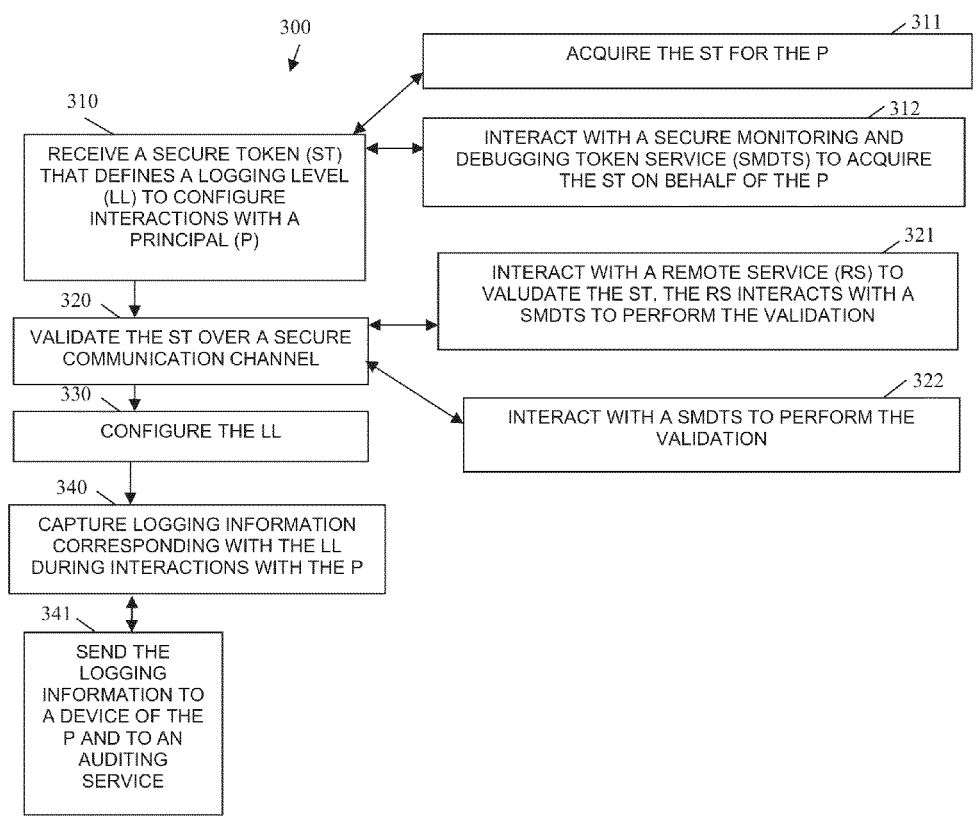
FIG. 3 is a diagram of another method for secure logging, according to an example embodiment.

Processing from the perspective of the remote service is now presented with the discussion of the FIG. 3.

FIG. 3 is a diagram of another method 300 for secure logging, according to an example embodiment. The method 300 (herein after referred to as "remote network logging service") is implemented, programmed, and resides within memory and/or a non-transitory machine-readable storage medium that executes on one or more processors of a server and is operational over a network. The network may be wired, wireless, or a combination of wired and wireless.

The remote network logging service is presented from the perspective of a network service that provides secure logging, such as, but not limited to the Company Web Service presented above with respect to the FIGS. 1A-1C. The remote network logging service interacts with the SMDTS (presented in the FIGS. 1A-1C and 2 above).

At 310, the remote network logging service receives a secure token that defines a logging level to configure for interactions with a principal. Again, the principal can be an end user or can be an automated service. The interactions can occur via a browser or via a mobile app with the principal. The "logging level" defines the types of logging information to capture, the frequency of capturing the types of logging information or events for which the types of logging information are to be captured, and/or where and when to send the captured logging information.

According to an embodiment, at 311, the remote network logging service acquires the secure token from the principal. Here, the principal may be authenticated via the secure token as well. Moreover, it may be that the secure token is signed by the principal (in addition to having signatures of other entities such as the SMDTS).

In another case, at 312, the remote network logging service interacts with a SMDTS (see above discussion with respect to the FIGS. 1A, 1B, 1C, and 2) to acquire the secure token on behalf of the principal. Here, a signature of the secure token for the SMDTS may be validated as well and the SMDTS may be received over a secure channel (SSL, Virtual Private Network (VPN), and the like).

At 320, the remote network logging service validates the secure token over a secure communication channel. Here, the remote network logging service uses a service, such as (but not necessarily required see the processing of 321) the SMDTS (see 322 below) to validate the secure token on behalf of the remote network logging service.

In an embodiment, at 321, the remote network logging service interacts with a remote service to validate the secure token. This remote service then interacts with a SMDTS to perform the validation of the secure token (see the FIG. 1C above and its corresponding discussion).

In another case, at 322, the remote network logging service interacts with the SMDTS to perform the validation of the secure token (see the FIG. 1B above and its discussion).

At 330, the remote network logging service configures the logging level within the remote network logging service or other services related to or within the control of the remote network logging service. At this point, the remote network logging service is ready to interact with the principal and capture information defined by the logging level.

Thus, according to an embodiment, at 340, the remote network logging service captures the logging information corresponding with the logging level during interactions with the principal.

Continuing with the embodiment of 340 and at 341, the remote network logging service sends the logging information to the device of the principal and to an auditing service (which may or may not be part of the remote network logging service). The captured logging information may itself be encrypted before being sent to the principal. Moreover, a secure communication channel can be used to send either the encrypted or unencrypted logging information. Still further, the remote network logging service may send the principal a temporary id and password to use to log onto a temporary secure site to acquire the logging information (the principal may be required to sign on and acquire the logging information with a predefined time or with a time range).

Figure 4:
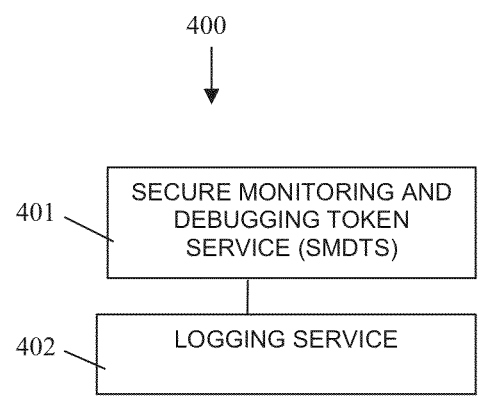
FIG. 4 is a diagram of a secure logging system, according to an embodiment.

FIG. 4 is a diagram of a secure logging system 400, according to an embodiment. The components of the secure logging system 400 are implemented as executable instructions that reside within memory and/or non-transitory computer-readable storage media and those instructions are executed by one or more devices. The components and the devices are operational over a network and the network can be wired, wireless, or a combination of wired and wireless.

According to an embodiment, the secure logging system 400 implements, inter alia, the features of the FIGS. 1A-1C and 2-3.

The secure logging system 400 includes a SMDTS 401 and a remote network logging service 402. Each of these and their interactions with one another will not be discussed in turn.

The secure logging system 400 includes a first device having memory configured with SMDTS 401. Example processing associated with the SMDTS 401 was presented above in detail with reference to the FIGS. 1A-1C and 2.

The SMDTS 401 is configured to generate a secure token based on a policy evaluation that defines a logging level for the remote logging service 402 to use when interacting with a principal and wherein the SMDTS 401 is configured to validate the secure token for the logging service 402.

According to an embodiment, the SMDTS 401 is further configured to sign the secure token.

The secure logging system 400 includes a second device having memory configured with remote network logging service 402. Example processing associated with the remote network logging service 402 was presented above in detail with reference to the FIGS. 1A-1C and 3.

The remote network logging service 402 is configured to capture logging data in accordance with the logging level and report the logging data to an auditing service.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by a device configured to perform the method, comprising:
   receiving, by a Secure Monitoring and Debugging Token Service (SMDTS) executing on the device, selections for logging information with a remote service, the selections identifying what monitoring information that is to be produced by and retained by the remote service, and the selections made by a principal, the principal desiring interaction with the remote service and the selections for the logging information captured by the remote service during that interaction, wherein the remote service is external to a principal device operated by the principal;
   evaluating, by the SMDTS, a policy to determine whether the selections are permissible;
   generating, by the SMDTS, a secure token that defines a principal identity for the principal, roles for the principal, and a remote service identity for the remote service, and specific logging levels for the selections as permitted by the policy;
   sending, by the SMDTS over a network connection, the secure token to the principal as a signed security assertion token;
   receiving, by the SMDTS, the secure token over a secure or non-secure communication channel from the remote service;
   validating, by the SMDTS, the secure token; and
   returning, by the SMDTS, the specific logging levels permitted by the policy to the remote service based on the validated secure token.

2. The method of claim 1 further comprising, sending, by the SMDTS, the signed and encrypted secure token to the remote service.

3. The method of claim 1, wherein receiving further includes receiving the selections directly from the principal.

4. The method of claim 1, wherein receiving further includes receiving the selections from the remote service on behalf of the principal who is interacting with the remote service.

5. The method of claim 1, wherein evaluating further includes using the principal identity and the remote service identity for the remote service to select the policy.

6. The method of claim 1, wherein evaluating further includes using the policy to define in the secure token where the logged information defined by the selections is to be sent.

7. The method of claim 6, wherein using further includes defining an auditing service as one recipient of the logged information and the principal as another recipient of the logged information.

8. A method implemented in a non-transitory machine-readable storage medium and processed by a server configured to perform the method, comprising:

receiving, by a remote network logging service executing on the server, a secure token that defines a logging level for monitoring data to configure for interactions with a principal and defines what information to capture for that logging level, and the secure token defining roles, and a principal identity for the principal, and the secure token produced by the principal making selections, wherein the secure token is an encrypted and signed security assertion token, the principal interacting with the remote network logging service from a principal device operated by the principal and the remote network logging service external to the principal device;

validating, by the remote network logging service, the secure token over a secure communication channel by sending the secure token to a remote service and receiving from the remote service the logging level with an indication that the secure token is validated;

configuring, by the remote network logging service, the logging level for capturing the monitoring data during the interactions with the principal on the server; and capturing, by the remote network logging service logging information corresponding with the logging level during the interactions with the principal.

9. The method of claim 8 further comprising, sending the logging information to the principal device of the principal and to an auditing service.

10. The method of claim 8, wherein receiving further includes acquiring the secure token from the principal.

11. The method of claim 8, wherein receiving further includes interacting with a secure monitoring and debugging token service to acquire the secure token on behalf of the principal.

12. The method of claim 8, wherein validating further includes interacting with a secure monitoring and debugging token service to perform the validation, wherein the secure monitoring and debugging token service is the remote service.

13. A system, comprising:

a device having memory configured with a secure monitoring and debugging token service (SMDTS) processing on the target device; and a server having memory configured with a logging service processing on the server;

wherein the SMDTS is configured to generate a secure token based on a policy evaluation that defines a logging level for the logging service to use when interacting with a principal while the principal interacts with the logging service over a network connection from a principal device operated by the principal, the secure token produced by selections of the principal and identify what information to produce for the logging level and the information produced from the logging level produced by the logging service and retained by the logging service on the server, and the secure token defines a principal identity for the principal and roles, and wherein the SMDTS is configured to validate the secure token for the logging service, and the logging service is configured to capture logging data in accordance with the logging level and report the logging data to an auditing service, and wherein the SMDTS is configured to encrypt the secure token and provide the secure token to the principal as a security assertion token, and wherein the SMDTS is configured to: i) receive the secure token over a secure or non-secure communication channel from the logging service, ii) validate the secure token, and iii) return the logging level permitted by the policy to the logging service based on the validated secure token.

14. The system of claim 13, wherein the SMDTS is configured to sign the secure token.

\* \* \* \* \*